Oct. 16, 1951 R. G. THOMPSON 2,571,785

DRIVE MECHANISM FOR TAPE FACSIMILE APPARATUS

Filed Sept. 17, 1949 2 SHEETS—SHEET 1

RUSSELL G. THOMPSON
INVENTOR
BY Daniel J. Mayne
Kolla N. Carter
ATTORNEYS

Oct. 16, 1951 R. G. THOMPSON 2,571,785

DRIVE MECHANISM FOR TAPE FACSIMILE APPARATUS

Filed Sept. 17, 1949 2 SHEETS—SHEET 2

RUSSELL G. THOMPSON
INVENTOR

BY Daniel J. Mayne
Rolla N. Carter
ATTORNEYS

Patented Oct. 16, 1951 2,571,785

UNITED STATES PATENT OFFICE 2,571,785

DRIVE MECHANISM FOR TAPE FACSIMILE APPARATUS

Russell G. Thompson, Rochester, N. Y., assignor to Eastman Kodak Company, Rochester, N. Y., a corporation of New Jersey Application September 17, 1949, Serial No. 116,310

4 Claims. (Cl. 178—6.6)

This invention relates to facsimile apparatus and more particularly to apparatus including in one machine pick-up and recording scanning devices together with associated mechanism for local reproduction of graphic subject matter.

In such facsimile apparatus and particularly that of the continuous tape recording type certain different portions of the mechanism should operate in an invariable relation while other certain portions should operate in a definite but adjustable relation so as to make it possible to regulate the apparatus for superior results.

The primary object of the invention is to provide apparatus of this kind which shall combine suitable driving arrangements for the scanning devices and for the feeding devices in an efficient assembly which contributes to both simplicity and operating quality.

Figure 1:
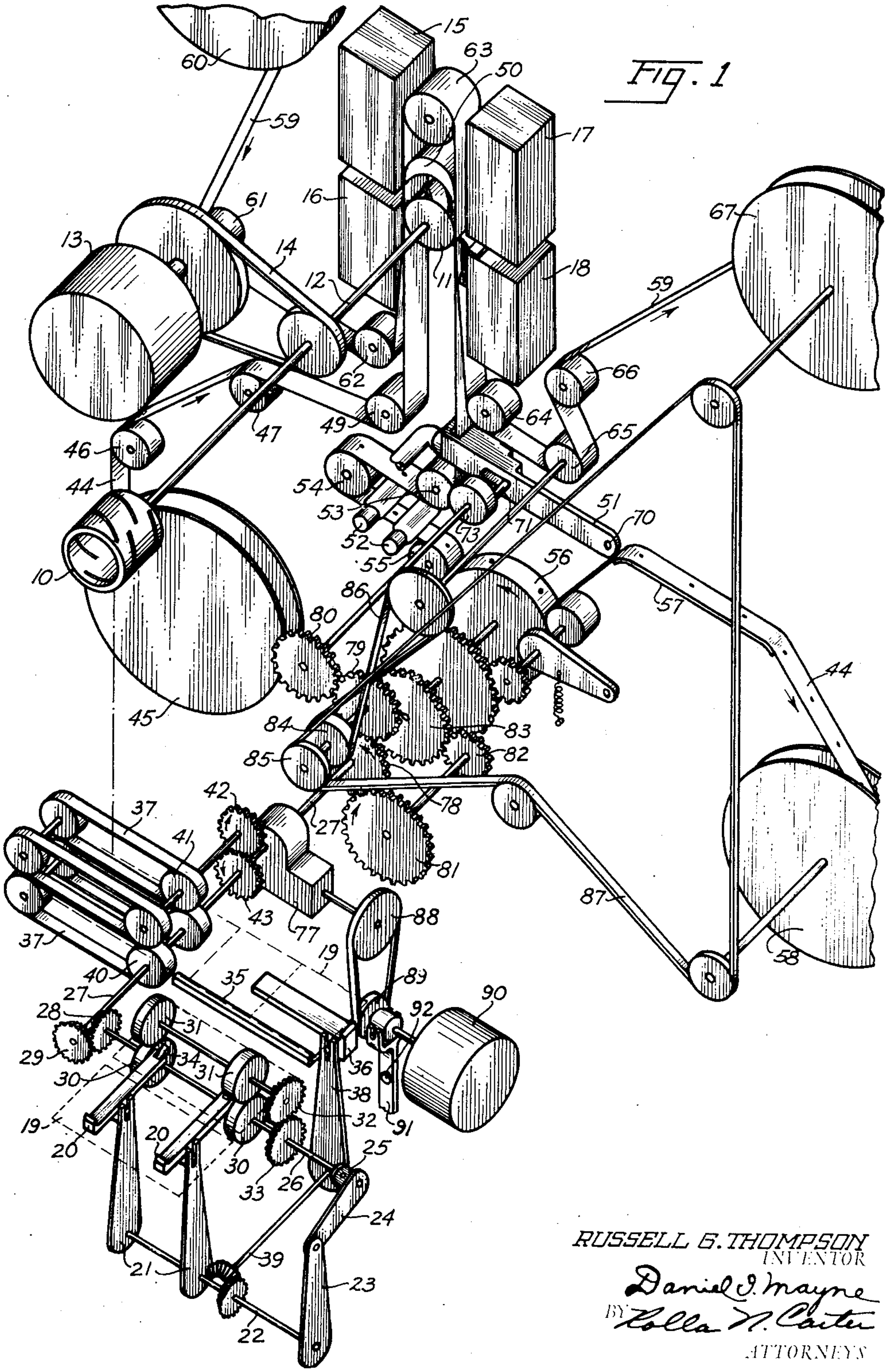
Figure 2:
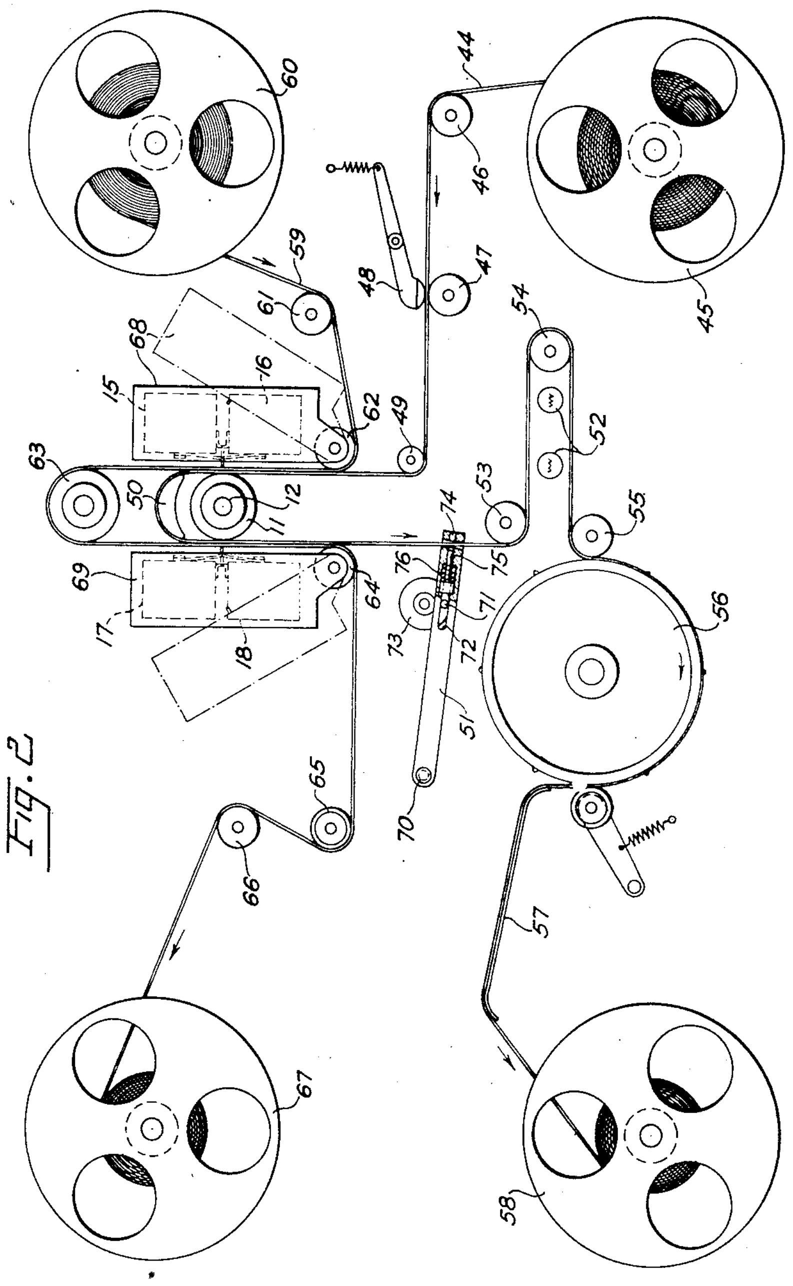

Other objects and advantages of the invention will appear from the following description of a preferred embodiment, reference being had to the accompanying drawings in which:

Fig. 1 is a perspective view of the moving parts of a tape facsimile apparatus incorporating the invention; and Fig. 2 is a rear elevation of the apparatus of Fig. 1 showing the parts determining the paths of the two continuous strips employed in recording.

In order that the utility of the driving arrangement may be readily appreciated, a general description of the overall functioning of the apparatus will first be given with primary reference to Fig. 1, although like parts shown in Fig. 2 are given like reference characters. The preferred embodiment to be described in detail is of the general type of the apparatus disclosed in my pending application Serial No. 22,683, filed April 22, 1948, now Patent No. 2,529,978, granted November 14, 1950, and is useful in recording along the length of a tape subject matter contained on a series of discrete documents such as business cards.

As shown in Fig. 1 a transmitter scanning member 10 and a recorder scanning member 11 are mounted for synchronous operation on a shaft 12 adapted to be rotated at a high speed by a motor 13 through a belt 14. As is fully described in an application Serial No. 116,360 filed concurrently herewith by Clayton E. Hunt, Jr., the scanning member 10 derives signals representative of the scansion values of different portions of a document as it passes successively through two stations and these signals are employed to actuate four recording devices 15, 16,

17 and 18 distributed between two recording positions spaced around the circumferences of the recording member 11 consistent with the manner the document is scanned by the member 10. Instead of the scanning arrangement shown, the ordinary arrangement of a single transmitter scanner and a single recorder scanner may be employed.

The discrete documents to be scanned are assumed to be business cards bearing printed addresses on approximately one half the length of each card so that successive cards may be fed with their leading half length bearing the printed address overlapping the trailing half length of the immediately preceding card. These cards 19 are fed sidewise from the bottom of a stack one at a time by pickers 20 which are reciprocated by rocker arms 21 carried by a shaft 22 connected through cranks 23 and 24 to be rotated back and forth by an eccentric 25 which rotates with a shaft 26 geared to a main drive shaft 27 through gears 28 and 29. The shaft 26 is provided with two rollers 30 which cooperate with two rollers 31 driven through gears 32 and 33 by the shaft 26 to receive each card 19 moved into their bite by the pickers 20 and to discharge it on the other side of the rollers 30 and 31. The picker bars 20 have near their inner ends depressible pushers 34 which engage the trailing edge of a card 19 as it leaves the rollers 30 and 31 and pushes it onto a conveyer track 35 where the card 19 is moved lengthwise by a reciprocating member 36 to conveyor belts 37. The member 36 is reciprocated in synchronism with the pickers 20 and the pushers 34 by a rocker arm 38 whose shaft 39 is geared to the rocker shaft 22.

The pushers 34 move the cards 19 sideways and the member 36 moves them lengthwise at approximately equal rates so that a card 19 has been moved by the member 36 and the belts 37 a distance equal to about half its length when another card 19 is moved onto the conveyer track 35. It is thus apparent that the trailing half of each card is overlapped by the leading half of the next succeeding card as they travel along with the conveyor belts 37. The two scanning stations mentioned above are spaced along the path of travel of cards being moved by the conveyer belts 37 so that they are scanned by the cylinder 10 prior to being discharged therefrom. The lower pair of conveyer belts 37 are driven by rollers 40 mounted on the main drive shaft 27 while the upper pair of belts 37 are driven by rollers 41 connected to the main drive shaft 27 through gears 42 and 43.

The handling of the recording media will first be described by referring to Fig. 2 where a paper tape 44 from a supply reel 45 passes over a guide roller 46, between a roller 47 and a spring pressed braking member 48, under a guide roller 49, upwardly between the recording helix 11 and the recorders 15 and 16 and over a stationary guide 50, downwardly between the recording helix and the recorders 17 and 18 and through a flying punch 51 which perforates it, thence looped over and under heating lamps 52 by rollers 53, 54 and 55, the latter of which seats it on a sprocket drum 56, and then over an inspection guide plate 57 to a takeup reel 58.

Carbon paper 59 in the form of a strip or ribbon moves from a supply reel 60 in a path between the paper tape 44 and the recorders 15 and 16 and between the paper tape 44 and the recorders 17 and 18 where the carbon material is transferred to the paper tape 44 in accordance with signals received by the several recorders 15, 16, 17 and 18. The carbon strip 59 is guided through this path by suitable rollers 61, 62, 63 and 64 and to a drive roller 65 after which the carbon strip 59 travels over a roller 66 to a takeup reel 67. The drive roller 65 draws the carbon strip 59 from the supply reel 60 and through its intervening path at a speed considerably below the speed of the paper tape 44 for reasons of economy. The carbon strip supply reel 60 and also the paper tape supply reel 45 are preferably mounted so as to have enough turning friction to place their respective strips under tension. Also the takeup reels 58 and 67 are preferably rotated through suitable tendency drives (not shown) to maintain their respective strips under tension.

Still referring to Fig. 2, the recorders 15 and 16 may conveniently be mounted in a housing 68 pivotally supported on the axis of the roller 62 so that the housing 68 may be rotated to the position indicated in broken lines to facilitate threading the two strips. Similarly, the recorders 17 and 18 may be mounted in a housing 69 pivotally supported on the axis of the roller 64.

The flying punch 51, shown partly in section, has one end mounted on a pivot pin 70 about which it is oscillated by a pin 71 extending into a slot 72 and eccentrically mounted on a rotatable disc 73. The free end of the punch 51 has a longitudinal die aperture 74 which extends through both walls of a vertical recess through which the paper tape 44 passes. A punch member 75 extending into the die aperture 74 is normally held out of the path of the paper 44 by a spring 76. The eccentric pin 71 is held captive by the slot 72 so that upon rotation of the disc in a clockwise direction the pin 71 oscillates the arm 51 and at its extreme position in the slot 72 engages the punch member 75 to force it through the paper tape 44. The speed of rotation of the disc 73 is such that during the short period of the punching operation the end of the arm 51 has substantially the same speed and direction of movement as that of the paper tape 44.

Referring back to Fig. 1, it will be noted that the main drive shaft 27 which drives the complete card feed mechanism extends through a gear box 77 and carries at its other end a gear 78 which through suitable gear trains drives the punch actuating disc 73 and the sprocket drum 56 in the synchronous relation required for registering the perforations formed in the paper tape 44 with the teeth of the sprocket drum 56 when seated thereon by the roller 55. The gear train for the punch disc 73, starting with the driving gear 78 consists of gears 79 and 80. The gear train for the sprocket drum 56, again starting with the driving gear 78, consists of gears 81 and 82 on a common shaft and a gear 83 on the shaft of the sprocket drum 56.

Mounted on the shaft of the gear 79 are two pulleys 84 and 85 for driving, respectively, through belts 86 and 87 the carbon strip advancing roller 65 and the two takeup reels 58 and 67.

The main drive shaft 27 is driven through the gear box 77 by a pulley 88 which is belted to a pulley 89 carried on the shaft of a motor 90. Either the motor 90 is adjustable in speed or the effective diameter of the driving pulley 89 is adjustable for regulating the definition of the recording lengthwise of the paper tape 44. This provides flexibility in accommodating the apparatus to different type fonts used in printing the original. It will be appreciated that by thus regulating the longitudinal definition, the relative size of the recording is not affected but only the speed of the recording. This speed is generally the highest which can be employed consistent with good quality reproduction and will differ with different originals. The quality of the recording may be observed as the tape 44 passes over the inspection plate 57 on its way to the takeup reel 58.

The speed of the motor 90 may be regulated in any well known manner (not shown) to vary the speed of the drive. However, it is preferred at present to obtain the desired speed variations by employing a V-belt split pulley 89, the effective diameter of which may be closely regulated by movement of an arm 91 about a pivot 92. Such pulleys adjustable in effective diameter are well known.

While for the purpose of disclosing the invention a single embodiment has been described in detail, the principles involved have been made clear enough to enable anyone skilled in the art to make the obvious modifications necessary to adapt the invention to other embodiments without departing from the scope of the appended claims.

What I claim as new and desire to secure by Letters Patent of the United States is:

1. In a facsimile apparatus a scanning cylinder and a printing helix mounted on a common shaft, a motor for driving said shaft at a constant speed, rotatable means for advancing discrete documents to be copied past the scanning cylinder, sprocket means for pulling a record receiving tape past the printing helix, a flying punch for perforating said tape as it moves between the printing helix and the sprocket means, a main drive shaft for rotating the document advancing means, motor means connected in driving relation to the main drive shaft, a rotatable member geared to the main drive shaft for actuating said punch in timed relation with the document-advancing means, and gearing connected to the main drive shaft to drive the sprocket means in exact phase relation with said punch.

2. In facsimile apparatus in accordance with claim 1 wherein the motor means for driving the main drive shaft is adjustable in speed for regulating the definition of the recording without altering its magnification.

3. A facsimile recorder including a recording cylinder and means under the control of received signals for marking a tape moved over the cylinder, means for drawing a plain tape over the cylinder comprising a sprocket and, between the sprocket and the cylinder, a flying punch for perforating the tape consistent with the sprocket.

4. A facsimile recorder in accordance with claim 3 wherein a common source of rotary power drives the sprocket and actuates the flying punch.

RUSSELL G. THOMPSON.

REFERENCES CITED

The following references are of record in the file of this patent:

UNITED STATES PATENTS

| Number | Name | Date |
|---|---|---|
| 1,629,466 | Angel | May 24 1927 |
| 2,213,876 | Young | Sept. 3, 1940 |
| 2,279,161 | D'Humy | Apr. 7, 1942 |
| 2,391,984 | Lake | Jan. 1 1946 |